Nov. 22, 1949  B. L. BINFORD  2,488,758
MAGNETIC CONTROL DEVICE
Filed Jan. 26, 1946
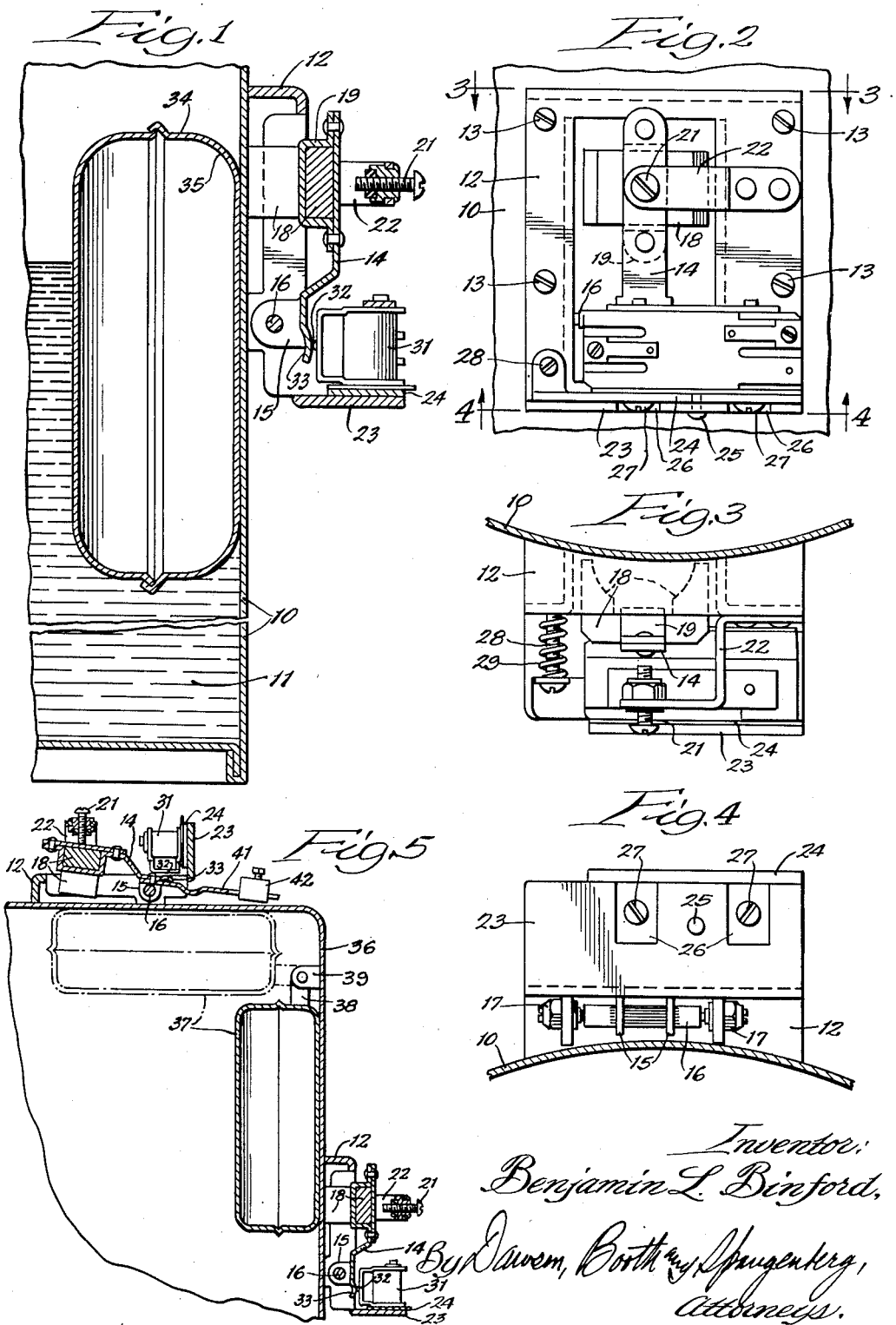
Inventor:
Benjamin L. Binford,
By Dawson, Booth and Spangenberg,
Attorneys.

Patented Nov. 22, 1949

2,488,758

UNITED STATES PATENT OFFICE 2,488,758

MAGNETIC CONTROL DEVICE

Benjamin L. Binford, Chicago, Ill., assignor to Magnetrol, Inc., Chicago, Ill., a corporation of Illinois Application January 26, 1946, Serial No. 643,781

5 Claims. (Cl. 200—84)

This invention relates to magnetic control devices and more particularly to control devices to be used with a tank or the like to be magnetically operated by a float in the tank.

One of the objects of the invention is to provide a magnetic control device which is adapted to be mounted directly on a tank or the like to be operated magnetically by a float supported on liquid in the tank.

Another object is to provide a magnetic control device in which there is a substantial overlap between the positions of the float to produce engagement and disengagement of the device. According to one construction, the float is shaped to provide a gradual variation of the air gap between the float and the magnet for this purpose.

Still another object is to provide a magnetic control device in the form of a unitary construction adapted to be installed on tanks or the like, as desired.

Still another object is to provide a magnetic control device which is operated solely by the forces of gravity and the magnetic force of the device.

A still further object is to provide a magnetic control device in which the stroke or total movement of the magnet can be adjusted and the position of the control element operated by the magnet can also be adjusted to produce the desired operation.

The above and other objects and advantages of the invention will be more readily apparent from the following description when read in connection with the accompanying drawing, in which—

Figure 1 is a partial section through a tank on which a magnetic control device embodying the invention is mounted;

Figure 2 is a partial elevation looking from the right of Figure 1;

Figures 3 and 4 are top and bottom plan views on the lines 3—3 and 4—4 respectively of Figure 2, and Figure 5 is a view similar to Figure 1 of an alternative arrangement.

The device, as illustrated in Figure 1, is adapted to indicate or to maintain the level of liquid in a tank 10, at least a portion of whose side wall is formed of non-magnetic material, such as brass, plastic or the like. The tank is adapted to contain a body of liquid indicated at 11 whose level is adapted to be maintained substantially at the point shown.

The magnetic control device, as illustrated, comprises a frame 12 generally rectangular in outline and which is formed of a non-magnetic material such as brass. The frame is shaped to fit against the side of the tank 10, as illustrated, and may be secured thereto by screws 13 or like fastenings threaded into bosses on the outer surface of the tank. A lever 14 is pivotally mounted on the frame being connected as shown through ears 15 to a shaft 16 pivotally supported at its ends on adjustable pivot members 17 carried by the sides of the frame. The lever is offset outwardly at its upper end as shown and rigidly carries a U-shaped permanent magnet 18 which is secured thereto by a clamping member 19. The magnet is arranged with its poles toward the tank side wall and with its center portion clamped to the lever.

According to one feature of the invention, the lever and magnet are so constructed that the magnet will normally tend to fall away from the tank side wall under the influence of gravity. With the lever pivoted and offset, as shown in Figure 1, the center of gravity of the lever and magnet assembly will lie to the right of the pivot shaft 16 so that the magnet will tend to drop away from the casing turning the lever clockwise. Movement of the magnet in this direction is limited by an adjustable stop screw 21 carried by a bracket 22 on the frame. By adjusting the screw 21, it will be seen that the total movement of the magnet can be adjusted and that the maximum permissible space between the magnet and the casing side wall can be varied.

At its lower end the frame terminates in a horizontally extending wall portion 23 upon which a plate 24 is pivoted on a pin or rivet 25. The wall portion 23 is notched, as indicted at 26 in Figure 4, to provide space for the heads of fastening screws 27 which extend through the plate 24. The pivotal position of the plate 24 is controlled by means of a screw 28 extending through an upwardly extending ear on the plate and a spring 29 engaging the ear and the frame tending to separate them. By adjusting the screw 28, the plate 24 can be turned about its pivot to move toward and away from the lever 14, the spring 29 holding the plate in the desired adjusted position.

The plate 24 is adapted to carry a control unit indicated as a switch 31 secured to the plate by the bolts 27. The switch 31 has an operating finger 32 adapted to be engaged by a lower curved end portion 33 on the lever 14. With this construction as the lever 14 is turned counterclockwise, the button 32 will be depressed either to open or to close the switch, as desired. When the lever swings back clockwise, the portion 33 thereof will move away from the button 32 allowing it to move out under the influence of a spring in the switch either to open or to close the switch, as desired. It will be understood that the switch may be connected to any desired type of control or indicating mechanism to indicate or control the level of liquid in the tank. To make the control mechanism responsive to the liquid level in the tank, a float 34 formed of magnetic material is placed in the tank to be supported by the liquid therein. The float is confined in any desired manner to travel adjacent the wall on which the control mechanism is mounted but is otherwise freely movable in the tank. With the float up in the position shown in Figure 1, its upper edge portion lies adjacent the magnet 18 so that the magnet will be attracted to the float to turn the lever 14 counterclockwise and depress the switch button 32. The switch may control mechanism to stop the inlet of fluid to the tank at this time to prevent the level from rising undesirably high or may operate an indicator or the like to indicate that the level in the tank is at the desired value. As the float drops, its upper edge moves away from the magnet so that the magnet will fall away from the tank wall by gravity, permitting the operating button 32 of the switch to move out. This operation of the switch may control an indicator to indicate that the liquid level is too low or may control a liquid supply means to add more liquid to the tank.

In order to stabilize the operation of the unit so that it will not tend to operate too quickly in response to relatively small changes in liquid level, the float is so constructed as to provide a gradual variation in the air gap between the float and magnet. As shown, the corners of the float are rounded on a relatively large radius, as indicated at 35. As the float rises, the average air gap between the float and the magnet will be gradually reduced until the magnetic pull is finally sufficient to turn the lever 14. As the float falls, the average air gap between it and the magnet will gradually increase but since the change is not abrupt, the magnet will be held in until the float has fallen to a lower level than that required to move the magnet in initially. By varying the shape of the float, this overlap between the opening and closing positions of the float can be controlled as desired to give the mechanism the necessary stability. The overlap can also be controlled to some extent by adjustment of the stop screw 21 to vary the initial or maximum air gap between the float and the magnet.

Figure 5 illustrates an alternative arrangement in which two control units are employed, the control units being substantially similar to that shown in Figures 1 to 4 and having their parts indicated by the same reference numerals. As shown, the units are mounted respectively on the side and top of a tank indicated at 36 all or a part of which is formed of non-magnetic material. A float 37 in the tank has an arm 38 at one side thereof which is pivoted to a bracket 39 on the float side wall so that the float can swing between the dotted and full line positions shown.

The unit mounted on the top of the tank lies in a horizontal position as shown so that its magnet tends to fall toward the tank. To overcome this tendency an extension 41 is secured to the lever 14 and carries a weight 42 which is adjustably slidable thereon. The weight 42 is sufficiently heavy to overbalance the magnet 18 and may be adjusted to vary the extent of the overbalance.

In operation, when the liquid level in the tank is low, the float will drop to the full line position shown to attract the magnet of the side mounted unit. This will operate the switch of the side mounted unit to operate a signal or a filling apparatus. As the liquid level rises in the tank, the float will swing clockwise about the bracket 39 away from the tank side wall. The magnet of the side mounted unit will then fall away from the tank wall allowing the switch to open. If the level should continue to rise, the float will reach the dotted line position shown to attract the magnet of the top mounted unit. This unit may operate a signal or interrupt the liquid supply as desired. When the level again falls, the float will move away from the magnet of the top unit so that it will be raised by the weight 42 and the top unit switch will be opened.

It will be understood that the control unit of the present invention can be mounted on substantially any desired type of tank in substantially any desired position and that the scope of the invention is not limited to the exact arrangement shown nor otherwise than by the terms of the appended claims.

What is claimed is:

1. In combination with a tank adapted to contain liquid and having a non-magnetic wall portion, a float of magnetic material in the tank to move adjacent said wall portion, a non-magnetic frame secured to the outside of said wall portion, a lever pivotally mounted on the frame on an axis substantially parallel to the wall portion, a magnet carried by one end of the lever to move toward the wall portion when the float rises to a position adjacent the magnet, the lever normally occupying a position in which the magnet is spaced from the portion, a control switch pivotally mounted on the frame in a position to be engaged and actuated by the lever, and means to adjust the pivotal position of the switch on the frame.

2. A magnetic control device comprising a frame of non-magnetic material adapted to be mounted on a tank or the like, a lever pivoted on the frame, a magnet carried by one end of the lever, the lever normally occupying a position in which the magnet will be spaced from the tank, a control device pivotally mounted on the frame and having an operating member lying adjacent the lever to be engaged and actuated thereby, and means adjustably connecting the control device to the frame to adjust the pivotal position thereof.

3. A magnetic control device comprising a non-magnetic frame adapted to be mounted on a tank or the like, a lever pivoted on the frame on a horizontal axis, a magnet carried by the upper end of the lever, the lever and the magnet being so constructed and arranged that the magnet normally falls away from the tank, a switch pivoted on the frame having an operating member engageable with the lever adjacent its pivot, and adjustable means connecting the switch to the frame to adjust the pivotal position of the switch.

4. A magnetic control device comprising a non-magnetic frame adapted to be mounted on a tank or the like, a lever pivoted on the frame on a horizontal axis, a magnet carried by the upper end of the lever, the lever and the magnet being so constructed and arranged that the magnet normally falls away from the tank, an adjustable stop on the frame to limit movement of the magnet away from the tank, a switch movably mounted on the frame having an operating member engageable with the lever, and means for adjusting the position of the switch on the frame.

5. In combination with a tank adapted to contain liquid, a float in the tank, means pivotally mounting the float adjacent one side of the tank to swing between positions adjacent said side and adjacent the top of the tank, and control units mounted respectively on said side and the top of the tank, each of the control units including a lever pivoted on a horizontal axis generally parallel to the adjacent tank surface, a magnet carried by the lever to be attracted to the float, and a control device to be engaged and operated by the lever.

BENJAMIN L. BINFORD.

REFERENCES CITED

The following references are of record in the file of this patent:

UNITED STATES PATENTS

| Number | Name | Date |
| --- | --- | --- |
| 347,589 | Ghegan | Aug. 17, 1886 |
| 355,815 | Ghegan | Jan. 11, 1887 |
| 384,200 | Ghegan | June 5, 1888 |
| 530,592 | Kleritj | Dec. 11, 1894 |
| 692,217 | Sundh | Jan. 28, 1902 |
| 1,876,044 | Davis | Sept. 6, 1932 |
| 1,891,568 | Morris et al. | Dec. 20, 1932 |
| 2,043,530 | Dezotell | June 9, 1936 |
| 2,052,083 | Dayton | Aug. 25, 1936 |
| 2,204,161 | Shepherd | June 11, 1940 |
| 2,292,648 | Moore | Aug. 11, 1942 |
| 2,352,830 | Ford | July 4, 1944 |
| 2,439,753 | Reavis | Apr. 13, 1948 |